United States Patent [19]

Yamashita

[11] Patent Number: 4,816,105

[45] Date of Patent: Mar. 28, 1989

[54] METHOD OF MAKING PUNCHED LABELS OR THE LIKE

[75] Inventor: Kyouichi Yamashita, Yokohama, Japan

[73] Assignee: Koyo Jidoki Co., Ltd., Kanagawa, Japan

[21] Appl. No.: 39,855

[22] Filed: Apr. 20, 1987

[30] Foreign Application Priority Data

Apr. 18, 1986 [JP] Japan .................................. 61-89576

[51] Int. Cl.4 .......................... B32B 31/00; B26D 9/00

[52] U.S. Cl. ..................................... 156/267; 156/250; 156/510; 156/521; 156/567; 156/568; 83/663

[58] Field of Search ............... 156/521, 510, 567, 568, 156/267, 250; 83/670, 663, 405, 667

[56] References Cited

U.S. PATENT DOCUMENTS

| | | | |
|---|---|---|---|
| 3,871,597 | 3/1975 | LaMers | 226/97 X |
| 4,181,555 | 1/1980 | Hoffmann | 156/261 X |
| 4,332,635 | 6/1982 | Holbrook et al. | 156/521 X |
| 4,549,454 | 10/1985 | Yamashita . | |

*Primary Examiner*—Michael W. Ball
*Assistant Examiner*—Jeff H. Aftergut
*Attorney, Agent, or Firm*—Armstrong, Nikaido, Marmelstein & Kubovcik

[57] ABSTRACT

A strip of tape is cut into precise lengths of cut tape. The cut lengths of tape are transferred by a drum to a pair of drums rotating side by side. One of the rotating drums carries a die and the other a punch movable into and out of the die. The cut lengths of tape are held on the periphery of the die drum with two groups of vacuum pressure holes respectively provided inside and outside the perimeter of the die for selective release of a punched label and surrounding waste material.

1 Claim, 5 Drawing Sheets

METHOD OF MAKING PUNCHED LABELS OR THE LIKE

DETAILS OF THE INVENTION

1. Applicable fields of the invention

This invention relates to the method of making punched labels or the like.

2. Prior Art

If labels are square or are of other rectangular shape, this may be simply cut from elongated strips of material. It is much more difficult to form labels that are round or of other non-rectantular shape. In such cases, a punch and die cutting device or assembly is normally employed. From the point of cost effectiveness of material, it is very important to be able to form as many products as possible and to minimize the waste material for a given length of strip. The cost of the material, therefore, depends on in which position labels are punched from a given strip of material.

A prior art practice for cutting labels from a continuous strip is shown in FIG. 5 of the accompanying drawings. With reference to FIG. 5, a label L is shown one of a series of such labels being sequentially cut and punched from a strip A in such a manner that there remains a width T1 of waste material between one punch hole and the next. As this width T1 is shortened, there will be a corresponding curtailment in the amount of waste material B produced as a result of punching.

However, in this method, the remaining portion to the strip, constituting the waste material B has to be recovered be rewinding. If the width of T1 is reduced by too much, the waste strip will tear as it is being rewound, and the label forming machine will jam.

Accordingly, in conventional label forming devices, it is absolutely necessary to leave enough width around the punched holes to prevent tearing.

OBJECT OF THE PRESENT INVENTION

The present invention is directed to a method of solving the above mentioned problem by adding an additional cutting process which may appear to be superfluous, prior to the punching process. The method in accordance with the present invention enables the formation of labels with minimum waste space and is economically superior to that practiced previously.

DESCRIPTION OF THE PREFERRED EMBODIMENT

The following is a detailed description of a continuous process of label punching from a strip of material. The individual devices will be described with reference to the drawings.

Figure 1:
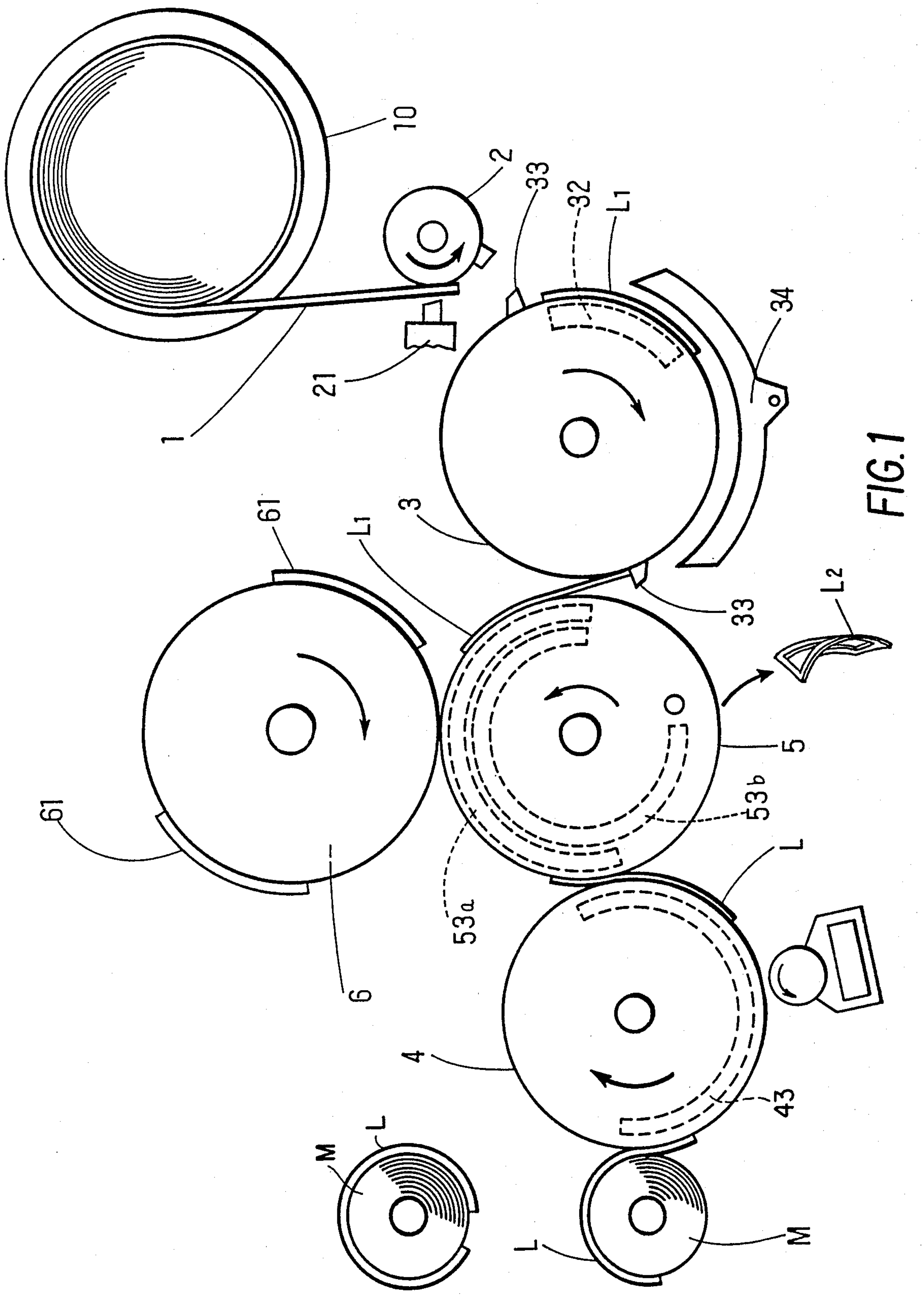
FIG. 1 is a diagrammatic, explanatory drawing illustrating one embodiment of the present invention.
Figure 2:
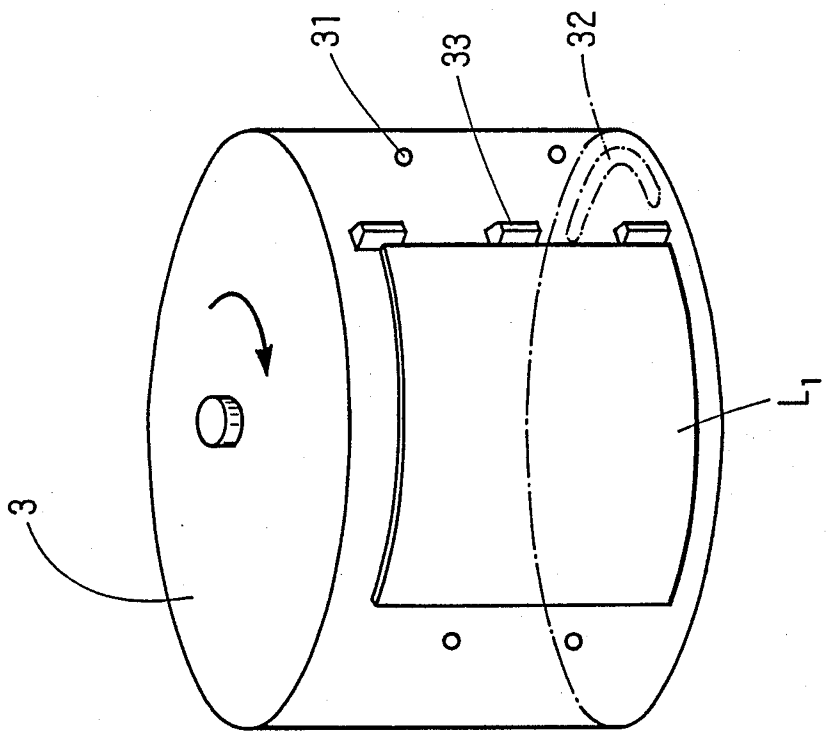
FIG. 2 is an isometric view showing details of the position adjusting drum of FIG. 1.

As illustrated in FIG. 1, a continuous tape or strip 1 label material is provided in rolling form on a spool 10. The strip 1 is then fed with a leading end to the cutting device comprising a rotating cutter 2 and a fixed cutter 21. The cutting device provides precise lengths of cut tape shown as a rectangular piece L1 in FIGS. 1 and 2. The rectangular piece L1 is then transferred to a position adjusting drum 3. The function of the position adjusting drum 3 is to adjust the serving position of the piece L1 while transporting it to a punching assembly.

Several vacuum holes 31 open to the cylindrical surface of periphery of the drum 3 are formed to connect to the bottom of the drum 3 via connecting pipes. A vacuum source port 32, which is of short elongated arcuate shape, is formed to begin from the tangent point defined by the point of the first contact of the rectangular piece L1 and follows the curve of the drum cylindrical wall. Thus, the vacuum holes 31 function only when the end of their passage pass directly over the vacuum source port 32 as the drum 3 rotates.

Further, a plurality of claws 33 forming stops are provided on the position adjusting drum 3. A guide wall 34 is provided at a position slightly spaced from the periphery of the drum 3. The guide wall 34 is so positioned as to prevent the pieces L1 from flying away from the drum surface. The transport of the pieces L1 by the drum 3 is so arranged that the piece L1 will adhere to the drum surface for only a minimal time. Subsequently, if the position of the piece L1 is not accurately fixed, it may be adjusted by the drum 3 prior to delivery to the next station in which punching of the label occurs.

Figure 3:
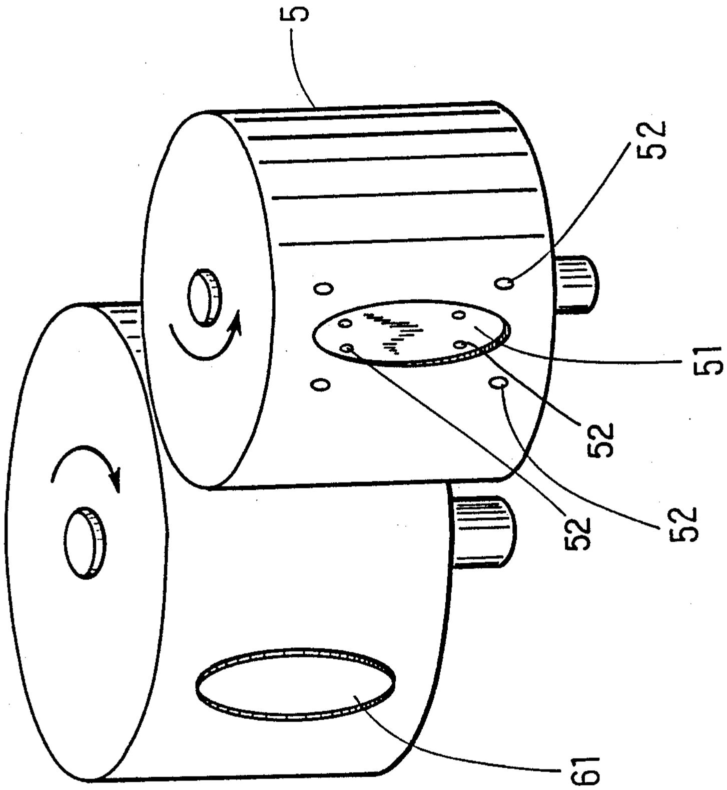
FIG. 3 is a perspective view showing the punch and guide drums of FIG. 1.
Figure 4:
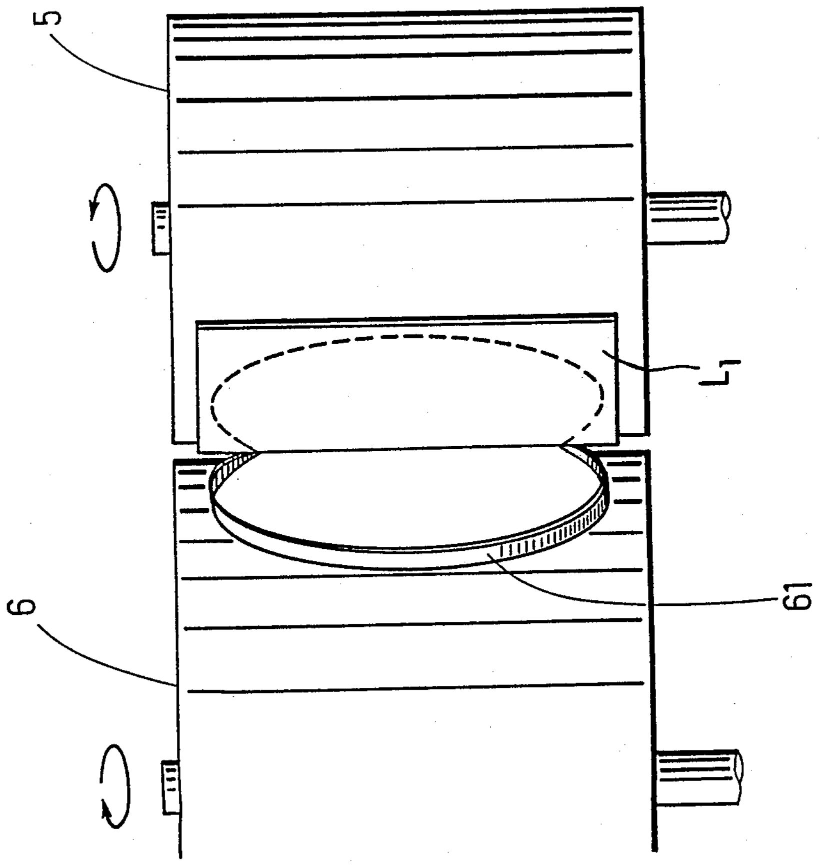
FIG. 4 is an enlarged view showing a further progressed relative position between the punch drum and die drum of FIG. 3.
Figure 5:
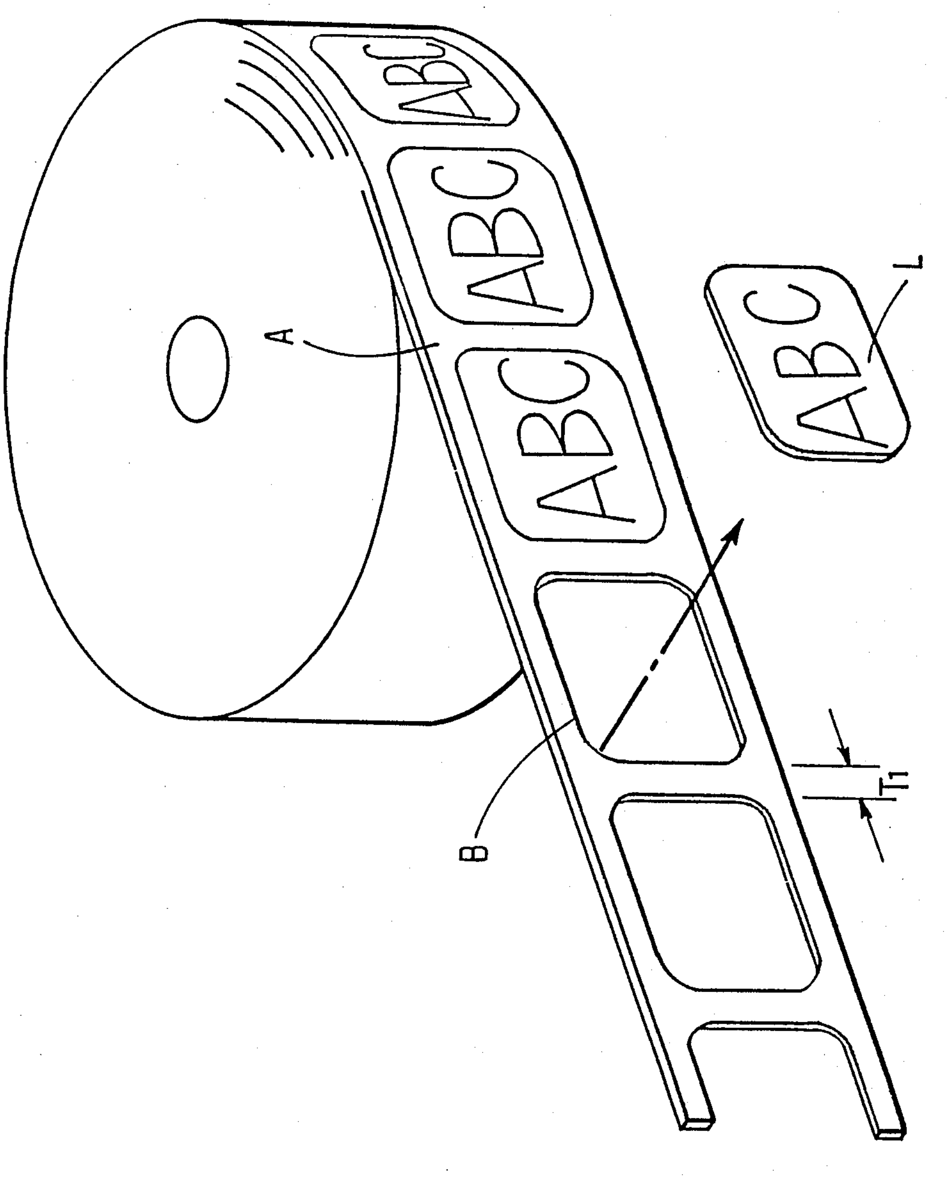
FIG. 5 PRIOR ART
FIG. 5 is a perspective view illustrating a prior art practice for cutting labels from a continuous strip.

The punching assembly comprises a die or receiving drun 5 and a punch drum 6 as shown by FIGS. 3 and 4.

The drums 5 and 6 are revolving, axially supported cylindrical structures. The receiving drum 5 and the punch drum 6 are placed in tandem and arranged to have successive cut pieces L1 pass between them to be punched to form labels L1.

As indicated in FIG. 3, a die 51 in the exact shape of the desired label is provided on the receiving drum 5. Inside and outside, but close to the perimeter of the die 51, there are provided several vacuum holes 52 moving in close proximity with the periphery of the above described position adjusting drum 3.

The ends of the vacuum holes 52 open by pipes extending to the bottom surface of the drum 5.

At the bottom surface of the receiving drum 5, two vacuum source ports are provided; one shorter vacuum port 53*a* to connect from a point in proximity to the periphery of the adjusting drum 3 to a point in closest proximity to the position of a paste drum 4, and the other a longer vacuum port 53*b*.

Accordingly, the holes 53 inside the die 51 exert suction only when they pass above the vacuum source 53*a* while the holes 52 ouside the die 51 exert suction only when they pass above the vacuum source 53*b*.

On the periphery of the punch drum 6, a punch 61 of the same shape as the die 51 mounted.

The following will explain the process according to the present invention.

A tape 1 is fed from a spool 10 with the leading roller to the cutting assembly. The tape is sequentially severed into cut pieces via the cutting device comprising the cutters 2 and 21 to form rectangular pieces L1.

The position adjusting drum 3 transports the piece L1 being adjusted to the periphery of the position adjusting drum 3 to the receiving drum 5. During the transporting, when the suction is terminated, stops 33 of the position adjusting drum 3 run up to the trailing edge of the strip L1 to adjust its position for supplying to the receiving drum 5.

By means of accurate timing of the rotation of the drums 3 and 5, the cut pieces or strips L1 are caused to separate from the drum 3 and to adhere to the periphery of the drum 5 by the application of suction of the periphery of the drum 5. The strip L1 continues its travel on the drum 5. When the strip L1 comes to the point of closest proximity to the punching drum 6, it encounters the punch 61 which enters the recess of the die 15 on the receiving drum 5. The label is then cut from the strip L1 to form the label L, which may be square, rectangular, or of various other shapes.

The label L is of almost exactly the same length as the strip L1, however, because of the accurately adjusted position of the strip L1, this cutting action never fails to produce an accurately cut label L.

The cut label L and its surrounding waste portion L2 travel on the receiving drum 5 being adhered by the vacuum holes 52 until the label and waste portion come into contact with the paste drum 4.

Vacuum holes on the periphery of the paste drum 4 open only within the area where the cut label L is to be placed and the suction from the shorter vacuum source port 53*a* ends at this point to release the label L. Accordingly, only the label portion L is delivered to the paste drum 4 from the receiving drum 5. Only the label L is taken over by the paste drum 4, whereas its surrounding waste portion L2 held by vacuum remains on the drum 5 and is then released as waste when the communication of the holes and the vacuum is terminated at the end of the longer vacuum source port 53*b*.

The label L held on the periphery of the paste drum 4 through the extent of vacuum source part 43 is applied and adhered to one of a series of sequentially provided containers M.

EFFECTIVENESS OF THE INVENTION

Conventionally, in the process of label punching from tapes, punched tape with a continuous frame or waste portion should be recovered by rewinding.

In the present invention, an additional tape cutting step which may at first appear to be superfluous is added, in which the tape is preliminary cut into rectangular pieces before punching to form various shapes of labels. As a result, the following advantages are obtained:

Since the tape is already cut when it reaches the label punching station, the width of waste tape left between label punches and between the upper and lower edges of the tape and label is no longer a critical concern.

These widths may be reduced to almost zero, which enable more effective use of tape to reduce production cost.

The method and apparatus may be applied effectively to numerous types of continuous tapes, such as metal tapes or resin tapes, thus being broadly applicable.

What is claimed is:

1. The method of cutting and supplying labels from a tape with minimal waste which comprises:

severing said tape at intervals into precise lengths of cut tape;

placing each cut length of tape on the periphery of a transfer drum for transfer of each cut length from the area of severance of the cut length to a pair of drums rotating side by side with one of said drums bearing a die and the other of said drums bearing a punch movable into said die during relative drum rotation;

holding said cut length of tape on the periphery of said one drum over said die with two groups of holes applying vacuum pressure to the periphery of said one drum until said punch moves into and out of said die thereby cutting a label, one group of the holes being close to and inside the perimeter of said die, the other group of holes being close to and outside the perimeter of said die;

rotating said one drum to move said label adjacent a paste drum;

discontinuing the application of said vacuum pressure to said one group of holes inside the perimeter of said die to transfer said label to said paste drum; and maintaining vacuum pressure to said other group of holes outside the perimeter of said die for selective release of the surrounding waste portion of said cut length of tape upon subsequent release of vacuum pressure applied to said other group of holes.

* * * * *